G. TUA.
AUTOMATIC DETENT MECHANISM FOR SLIDING BOLTS AND THE LIKE.
APPLICATION FILED MAR. 8, 1911.
1,039,615.  Patented Sept. 24, 1912.
2 SHEETS—SHEET 1.
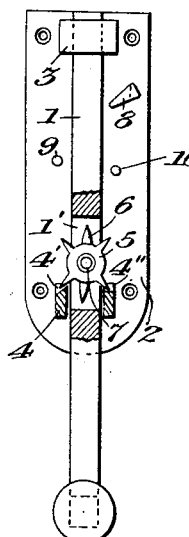
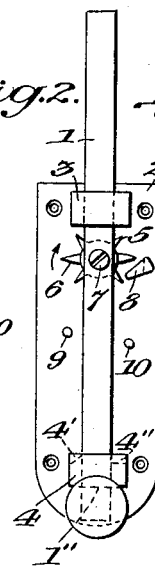
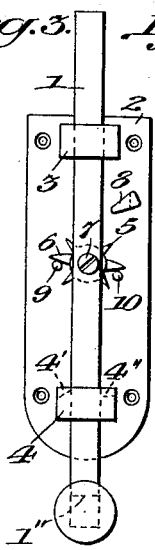
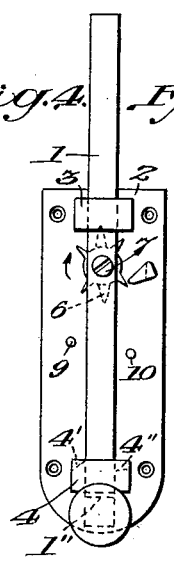
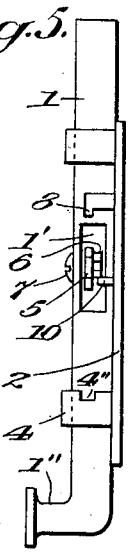
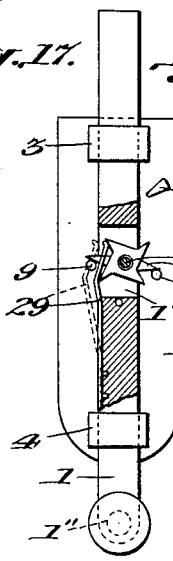
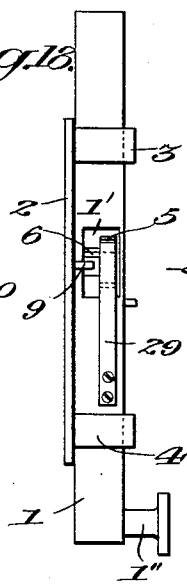
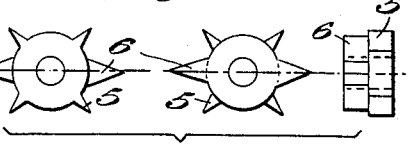
Witnesses:
P. Dommers
E. Leckert.
Inventor:
Giacinto Tua,
By Henry ... Atty.

G. TUA.
AUTOMATIC DETENT MECHANISM FOR SLIDING BOLTS AND THE LIKE.
APPLICATION FILED MAR. 8, 1911.
1,039,615.
Patented Sept. 24, 1912.
2 SHEETS—SHEET 2.
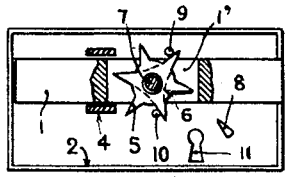
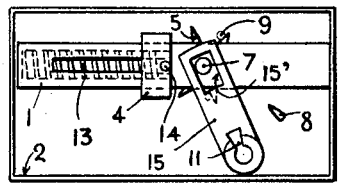
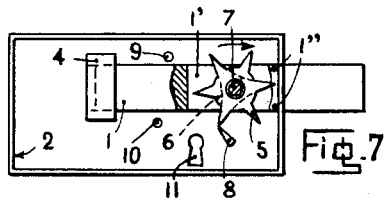
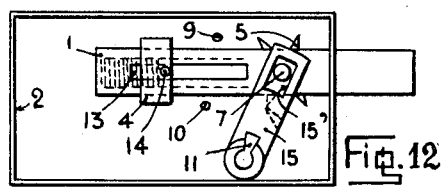
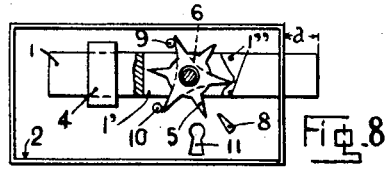
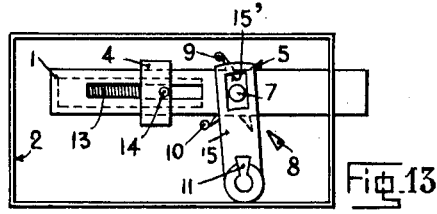
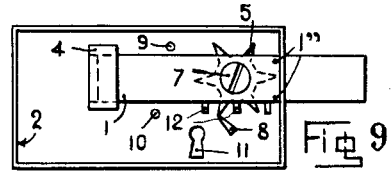
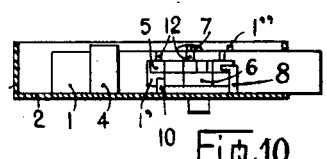
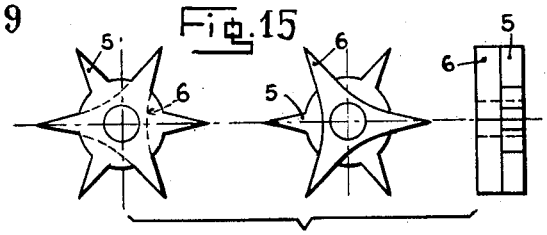
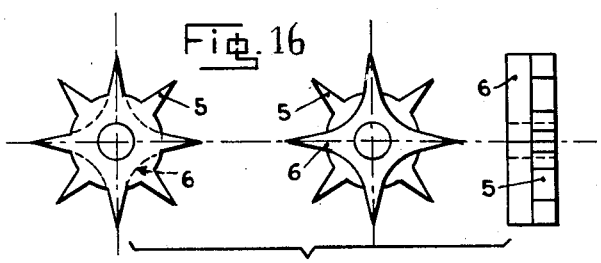
Witnesses:
B. W. Sommers
Elizabeth Leckert
Inventor.
Giacinto Tua,
By Henry Orth Jr
atty.
COLUMBIA PLANOGRAPH CO., WASHINGTON, D. C.

UNITED STATES PATENT OFFICE.

GIACINTO TUA, OF TURIN, ITALY.

AUTOMATIC DETENT MECHANISM FOR SLIDING BOLTS AND THE LIKE.

1,039,615.     Specification of Letters Patent.     Patented Sept. 24, 1912.

Application filed March 8, 1911. Serial No. 613,179.

*To all whom it may concern:*

Be it known that I, GIACINTO TUA, a subject of the King of Italy, residing at Turin, Italy, have invented certain new and useful Improvements in Automatic Detent Mechanism for Sliding Bolts and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to automatic detents for sliding bolts and the like adapted to stop the bolt between two distinct positions of its run with respect to a stationary element said bolt and stationary member being either separable or inseparable.

This detent comprises substantially—two toothed locking wheels on the same axle rigidly connected to one another, their teeth being either in or out of register; one, which will be called the "main wheel", having an even number of teeth, and the other, which will be called the "secondary wheel" having a number of teeth equal to one-half the number of teeth of the former; these two wheels are rigidly connected and capable of turning either with respect to the moving element or bolt, or with respect to the stationary element that carries them; three stops on the element not carrying the wheels, one of which will be called the "main stop", and can engage the teeth of the main wheel only, so as to cause its rotation to an angle slightly less than that included between two successive teeth. The two other stops, which will be called "secondary stops", can, on the contrary, engage the teeth of the secondary wheel only, serving thus to stop the movement of the moving element and to give such an angular displacement to the wheels as to complete their preceding rotation to an angle equal to that included between the teeth of the main wheel.

Some constructional forms embodying my invention have been shown by way of example in the accompanying drawings, in which like parts are similarly designated.

Figures 1 to 5 show an application of the invention to a bolt, which is shown in front elevation in Figs. 1 to 4 and in side elevation in Fig. 5. Figs. 6 to 10 illustrate an application to a lock, which is shown in rear view in Figs. 6 to 9, and in longitudinal section in Fig. 10. Figs. 11 to 13 illustrate another application to a lock, which is shown in rear view in all three figures. Figs. 14 to 16 show in front view, rear view and side view various forms of the correlated locking wheels. Figs. 17 and 18 show in front and side view, respectively, an improved form of the locking arrangement applied to a bolt or the like.

In the application of the invention to a locking bolt, as shown in Figs. 1 to 5, the movable element is the bolt 1 itself; the stationary element is constituted by the base plate 2, fitted with bolt guides 3 and 4 for the bolt 1. The locking wheels, rigidly connected together and preferably in one piece, shown in detail in Fig. 14, comprise the main wheel 5 having four teeth, and the secondary wheel 6 having two teeth, both mounted to rotate on the same pin 7. Such a pair having four teeth on the main wheel 5, and two teeth on the secondary wheel 6, is the simplest form, and differs somewhat in its operation from other sets of wheels of six and three teeth, eight and four teeth, &c., as hereinafter described. The pair of locking wheels 5 and 6 is arranged in a suitable slot 1' of the movable element or bolt, and mounted so as to be able to turn on a pin or screw 7. The arrangement is such that the wheel 5 is situated above and the wheel 6 below, that is adjacent to the base plate 2. The diameters of the wheels 5 and 6 are such that their teeth project beyond the sides of bolt 1.

The three stops mentioned above are formed—one, the main stop, by the tooth 8 on the base plate 2, suitably bent at an angle, and of such length as to project into the path of the main wheel 5 when the bolt 1 is displaced, while the teeth of the secondary wheel 6 pass freely beneath the same (see Figs. 2, 4 and 5). The two secondary stops are constituted by the two pins 9, 10, on the base plate 2 at opposite sides of the bolt 1, and of such height that only the teeth of the secondary wheel 6 can engage them (Fig. 3), while the teeth of the wheel 5 can freely pass above them (Fig. 5).

The operation of the bolt will be as follows:—Beginning with the position shown in Fig. 1, and causing the bolt to be thrown its full stroke, as shown in Fig. 2, until the stop 1″, forming the shank of the operating knob, strikes against the guide 4, one of the teeth of the wheel 5 engages the stop 8, and the wheel performs a rotation slightly less than one-fourth of a turn in the indicated direction. Then, by drawing the bolt 1 downward, as shown in Fig. 3, the teeth of the wheel 6, which have been brought to a transverse position, strike successively against stops 9 and 10 in such a way as to cause the pair of wheels further to rotate in the same direction, and thus complete their movement 90° or one-fourth of a turn. In the position shown in Fig. 3 (working position) the bolt 1, owing to the engagement of the secondary wheel 6 with stops 9 and 10, cannot be drawn back any farther. To enable it to be fully retracted, as shown in Fig. 1, it is necessary to project it again, as shown in Fig. 4. The main wheel 5 then moves again about one-fourth of a turn in the direction of the arrow; the teeth of the secondary wheel 6 assume a position longitudinally of the bolt 1 and can then freely pass between the stops 9 and 10, and the bolt 1 may therefore be fully retracted, as shown in Fig. 1, when the teeth of the main wheel 5 strike against the guide 4 and stop it. When the wheel 5 stops against the guide 4, the pair of wheels 5, 6, undergo a further rotation sufficient to complete an angle of 90°. This is owing to the fact that the guide 4 presents on one side of the bolt an oblique notch 4′ against which one of the teeth of the wheel 5 contacts when the bolt is retracted, while, on the other side the guide presents a groove 4″, at the bottom of which another tooth of the wheel 5 strikes as soon as the pair of wheels 5, 6, has undergone the above-mentioned additional rotation. The wheels 5, 6, then assume the position shown in Fig. 1, so that the upper tooth of the wheel 5 projecting to the right of bolt 1 will be in position to engage the stop 8, when the bolt is again projected, and the cycle of operations just described will be repeated.

Consideration must be given to the fact that it is indispensible that the wheels 5, 6, offer a slight resistance to turning on their pivot 7, in order to avoid overriding by inertia, as a rotation in excess of that required would hinder the proper cycle of operations. To this end it is expedient to introduce some friction rings between the wheels 5, 6, and the walls of the slot 1′. To the same end, recourse may be had to other means, as hereinafter specified.

In the application of the invention to a lock, as shown in Figs. 6 to 10, the movable element is constituted by the bolt 1 of the lock; the stationary element is constituted by the casing 2. The lock is operated by means of a key which is introduced through a hole 11 and which engages the sides of teeth 12 on the bolt 1, (see Figs. 9 and 10). In this instance the locking wheels consist of a six-toothed main wheel 5 and a three-toothed secondary wheel 6, as shown in detail in Fig. 15. The operation of this form of mechanism is as follows:—On projecting the bolt 1 from the position shown in Fig. 6 to its extreme position, Fig. 7, (limited by the stops 1″ coming into contact with the end of the case 2) the teeth of the wheel 5 engage the stop 8 and the two wheels 5, 6, are rotated slightly less than 60°, which is the angle formed between two successive teeth of the wheel 5. In retracting the bolt 1 to the position shown in Fig. 8 two teeth of the wheel 6 successively engage the stops 9, 10, on opposite sides of the bolt 1. The wheels 5, 6, are thereby given an additional rotation sufficient to complete the angle of 60° and, moreover, the bolt 1 is stopped in its locking position (Fig. 8). In order to fully retract the bolt, it is necessary to project it again, as in Fig. 9, so that one tooth of the wheel again engages the stop 8, and the wheels 5, 6, turn at an angle slightly less than 60°; the bolt 1 may then be brought to the position shown in Fig. 6, when the teeth of the wheel 6 successively strike the stops 9, 10, that cause the wheels 5, 6, to complete their angle of rotation.

From what has been said above, we see that the cycle of operations of the wheels 5, 6, having respectively six and three teeth, present, in comparison with the cycle of operations of the wheels having respectively four and two teeth, the following slight difference: With six and three toothed wheels the teeth of the secondary wheel 6 stop against the stops 9, 10 in their working position, Fig. 8, as well as in their initial position, Fig. 6; in the four and two toothed wheels the teeth of the wheel 6 engage the stops 9, 10 only in the working position, Fig. 3. In its return to initial position, Fig. 1, the teeth of wheel 6, owing to the fact that there are only two, place themselves in the direction of the axis of 1, and pass freely between the stops 9, 10. It is therefore, necessary to have recourse to a secondary stop (constituted in Figs. 1 to 5 by the guide 4,) in order to stop the movement of the moving element 1. The cycle of operations of the six and three toothed wheels is, on the other hand, the standard cycle of operations presented by all the other pairs of wheels, namely eight and four teeth, ten and five teeth, &c. The operation of the four and two teeth wheels is, therefore, to be considered as an anomaly or irregularity in the normal cycle of working. It is to be remarked, moreover, that, by increasing the quantity of teeth on the main wheel 5, without altering the dimensions of the other parts, the extent of projection of the bolt 1 (Fig. 8) is diminished. It is therefore necessary to choose a convenient number of teeth for 5, in accordance with the requirements of use.

In the application of the invention to a lock, as shown by Figs. 11 to 13, the locking wheels 5 and 6 are provided with six and three teeth respectively, as shown in Figs. 6 to 10; the cycle of operations is consequently the same as that described with reference to Figs. 6 to 10. In Figs. 11 to 13 the retraction of the bolt 1 is caused by a return spiral spring 13, inclosed in a suitable recess or cavity in the bolt 1 and abutting against a pin 14 fixed in the guide 4. Such a spring may, if required, be arranged and placed in any other way. The bolt 1 is indirectly operated by the lever arm 15 having a perforation 15′ that engages the pivot 7 projecting from the bolt 1, while the said lever arm 15 is operated from the outside by means of a key. Such an arrangement, as compared to that shown in Figs. 6 to 10 materially reduces the movement of the key required to operate the lock.

The present invention can be applied to any kind of lock, and may be applied with advantage to electrical switches.

In all the above described applications the movable element 1 is shown mounted unremovable with respect to the fixed element 2. The element 1 may, however, be made quite removable, as shown in the arrangement represented in Figs. 17 and 18. Such an arrangement is composed of a flat spring 29 fastened to 1 and having lateral engagement with the teeth of 5 at the side of the bolt opposite to stop 8.

In all of the above described applications the wheels are considered as fastened to the movable element, and the stops as fastened to the stationary element; such arrangement may, however, be quite as well reversed.

I claim—

1. The combination with a stationary element and a movable element capable of reciprocating in relation thereto; of a pair of toothed wheels mounted on one of said elements, one of said wheels having twice the number of teeth on the other wheel, said wheels secured together to rotate as a unit and stops on the other element, one of which is adapted to be engaged by the wheel having the greater number of teeth and two others adapted to be engaged by the wheel having the lesser number of teeth.

2. The combination with a stationary element and a movable element in slidable relation thereto; of a pair of toothed wheels mounted on one of the elements, one of said wheels having twice the number of teeth as the other wheel, and said wheels mounted to rotate as a unit, and stops on the other element one of which is in the depth of rectilinear movement of the wheel having the greater number of teeth and one on each side of and in the path of rectilinear movement of the other wheel, said latter stops adapted to engage said other wheel and prevent rectilinear movement of the parts in one direction.

3. The combination with a stationary element and a movable element capable of reciprocating in relation thereto; of a pair of toothed wheels mounted on one of said elements, one of said wheels having twice the number of teeth as the other wheel, said wheels secured together to rotate as a unit and three stops on the other element, one of which is adapted to be engaged by the wheel having the greater number of teeth and the two others on opposite sides of and adapted to be engaged by the wheel having the lesser number of teeth, one of said stops in advance of the other.

4. The combination with a stationary element and a movable element in slidable relation thereto; of a pair of wheels on one of the elements having respectively four and two teeth, and rotatable as a unit, three stops on the other element one of which is adapted to be engaged by the wheel having the greater number of teeth and the two others adapted to be engaged by the wheel having the lesser number of teeth, and auxiliary stops engaged by the wheel having the greater number of teeth when the movable element is in one of its end positions.

5. The combination with a stationary element and a movable element capable of reciprocating in relation thereto; of a pair of toothed wheels mounted on one of said elements, one of said wheels having twice the number of teeth on the other wheel, said wheels secured together to rotate as a unit, and stops on the other element, one of which is adapted to be engaged by the wheel having the greater number of teeth and two others adapted to be engaged by the wheel having the lesser number of teeth, and means engaging the wheels to prevent the over-riding of the latter.

6. The combination with a stationary element and a movable element capable of reciprocating in relation thereto; of a pair of toothed wheels mounted on one of said elements, one of said wheels having twice the number of teeth on the other wheel, said wheels secured together to rotate as a unit, and stops on the other element, one of which is adapted to be engaged by the wheel having the greater number of teeth and two others adapted to be engaged by the wheel having the lesser number of teeth, and a spring to urge the movable element to one of its end positions.

In testimony that I claim the foregoing as my invention, I have signed my name in presence of two subscribing witnesses.

GIACINTO TUA.

Witnesses:
FRANCENO SIMONI,
JOCELYN GOUBEYRAN.

Copies of this patent may be obtained for five cents each, by addressing the "Commissioner of Patents, Washington, D. C."